(12) United States Patent
Miller et al.

(10) Patent No.: US 7,454,107 B2
(45) Date of Patent: Nov. 18, 2008

(54) FIBER OPTIC CABLES SUITABLE FOR AUTOMATED PRECONNECTORIZATION

(75) Inventors: Allen M. Miller, Newton, NC (US); Warren W. McAlpine, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/264,241

(22) Filed: Nov. 1, 2005

(65) Prior Publication Data

US 2007/0098343 A1 May 3, 2007

(51) Int. Cl.
*G02B 6/44* (2006.01)
(52) U.S. Cl. .................. 385/113; 385/109; 385/100
(58) Field of Classification Search .......... 385/100–114
See application file for complete search history.

(56) References Cited

U.S. PATENT DOCUMENTS

| | | | | |
|---|---|---|---|---|
| 4,763,982 | A * | 8/1988 | Greveling | 385/109 |
| 6,501,888 | B2 | 12/2002 | Gimblet et al. | 385/113 |
| 6,542,674 | B1 * | 4/2003 | Gimblet | 385/113 |
| 6,567,592 | B1 | 5/2003 | Gimblet et al. | 385/113 |
| 6,714,710 | B2 | 3/2004 | Gimblet | 385/113 |
| 6,728,455 | B2 * | 4/2004 | Kusakari et al. | 385/113 |
| 7,313,304 | B2 * | 12/2007 | Andrews et al. | 385/107 |
| 2001/0036345 | A1 | 11/2001 | Gimblet et al. | |
| 2004/0076386 | A1 * | 4/2004 | Nechitailo | 385/100 |
| 2004/0223699 | A1 | 11/2004 | Melton et al. | |
| 2004/0223720 | A1 | 11/2004 | Melton et al. | |
| 2004/0228589 | A1 | 11/2004 | Melton et al. | |
| 2005/0053342 | A1 | 3/2005 | Melton et al. | |
| 2006/0029340 | A1 * | 2/2006 | Andrews et al. | 385/100 |

OTHER PUBLICATIONS

Draka Comteq Product Sheet, Flat Drop Cable with Toning Wire, May 2005, 2 pages.

* cited by examiner

*Primary Examiner*—Kevin S Wood
*Assistant Examiner*—John M Bedtelyon
(74) *Attorney, Agent, or Firm*—Michael E. Carroll, Jr.

(57) ABSTRACT

Fiber optic drop cables are disclosed that are suitable for automated preconnectorization. In one embodiment, an optical waveguide is disposed in a buffer tube that has two strength components disposed on opposite sides thereof and a plurality of strength members. The plurality of strength members are disposed at a plurality respective interstices located between the buffer tube and the two strength components and shaped into a plurality of substantially triangular shapes for improving the balancing of the residual stresses in the fiber optic cable caused by the shrinkage of a cable jacket during cooling. In another embodiment, a fiber optic cable includes a tonable lobe connected by a web that is frangible and the web includes predetermined ratios for easily and reliable separation of the tonable lobe.

16 Claims, 5 Drawing Sheets

FIBER OPTIC CABLES SUITABLE FOR AUTOMATED PRECONNECTORIZATION

FIELD OF THE INVENTION

The present invention relates generally to fiber optic cables suitable for routing optical fiber toward the subscriber such as fiber to the home applications. More particularly, the present invention relates to fiber optic cables having separable toning lobes and/or that are suitable in automated preconnectorization processes, although the invention is not limited to such applications.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. On the other hand, an optical waveguide is capable of transmitting an extremely large amount of bandwidth compared with a copper conductor. Moreover, an optical waveguide cable is much lighter and smaller compared with a copper cable having the same bandwidth capacity. Consequently, optical waveguide cables replaced most of the copper cables in long-haul communication network links, thereby providing greater bandwidth capacity for long-haul links. However, many of these long-haul links have bandwidth capacity that is not being used. This is due in part to communication networks that use copper cables for distribution and/or drop links on the subscriber side of the central office. In other words, subscribers have a limited amount of available bandwidth due to the constraints of copper cables in the communication network.

As optical waveguides are deployed deeper into communication networks, subscribers will have access to increased bandwidth. Deployment of optical waveguides toward the subscriber is generally called fiber to the location x (FTTx) applications and includes fiber-to-the-curb (FTTC) and fiber-to-the-home (FTTH) applications. There are certain obstacles that make it challenging and/or expensive to route optical waveguides closer to the subscriber. For instance, making a suitable optical connection between optical waveguides is much more complicated than making an electrical connection between copper wires. Additionally, as the communication network pushes toward subscribers, the communication network requires more connections, which compounds the difficulties of providing optical waveguides to the premises of the subscriber. Thus, routing fiber optic cables towards the subscribers requires a quick and easy solution for streamlining the installation process. Also, on the end of the network closest to the subscriber, smaller cables housing fewer optical fibers are typically used. Such cables have their own set of particular location, installation, termination, and connectorization issues generally not found with long haul cables.

For example, fiber optic cables routed toward the premises of the subscriber may be buried in the yard of the subscriber. Consequently, these buried fiber optic cables are preferably located and marked to prevent damage to the same before the subscriber or others dig. Generally speaking, the craft prefers dielectric cables since they do not have to be grounded and the like. However, dielectric cables are difficult to locate when buried. To address this problem, fiber optic cables have included a toning wire for locating the buried cable. The toning wire is typically a conductor such as copper wire that can be used to locate the buried fiber optic cable by sending a signal along the toning wire that can be detected above ground to locate the cable. Specifically, the route of a buried fiber optic cable having a toning wire is found by attaching a tone generator device to an exposed portion of the toning wire so as to generate an electrical toning signal along the toning wire. A detector is then used by the craft to find the buried portions of the toning wire by detecting the toning signal, thereby allowing marking of the cable location.

By way of example, U.S. Patent App. Pub No. 2005/0053342, the disclosure of which is incorporated herein by reference, discloses a preconnectorized fiber optic cable having a toning wire disposed in a toning lobe that is connected by a web to a main cable body. The preconnectorized cable includes a plug connector that allows the craft to quickly and reliably optically connect the cable. Before the plug connector can be attached to the end of the cable the toning lobe must be separated from a portion of the main cable body.

However, conventional toning lobes may not have been as readily or reliably separable from the main cable body as desired. At times, during separation of the toning lobe from the main cable body, the cable surface at the tear was not as smooth as desired after separating the toning lobe. In extreme cases, the toning lobes may have undesired separation from the main cable body or the toning wires may be inadvertently torn from their lobes without the desired separation at the web. In any event, leaving a poor tear and/or non-uniform surface at the point of removal can cause problems during the preconnectorization of the fiber optic cable. For instance, a poor tear or non-uniform surface where the tonable wire was removed may require further attention by the craft during connectorization to either remove the poorly torn section and/or use additional sealing elements, etc., to ensure environmental sealing of the cable in the connector. This is especially true for automated connectorization processes that require reliable and repeatable separation performance of the toning lobe. Thus, improved fiber optic cable designs incorporating a toning lobe that is easily separated from the main cable body without damage or leaving irregular surfaces are desirable.

SUMMARY OF THE INVENTION

One aspect of the present invention is directed to a fiber optic drop cable having a main cable body with at least one optical waveguide disposed in a buffer tube, two strength components disposed on opposite sides of the buffer tube, and a plurality of strength members. The plurality of strength members are disposed at a plurality of respective interstices located between the buffer tube and the two strength components, wherein the plurality of strength members are shaped into a plurality of substantially triangular shapes. The substantially triangular shapes are useful for improving the balancing of the residual stresses in the fiber optic cable due to shrinkage of a cable jacket during cooling.

Another aspect of the present invention is a fiber optic drop cable having a main cable body with at least one optical waveguide, at least one strength component, and a tonable lobe for locating the cable. The tonable lobe is connected to the main cable body by a web that is frangible. The web has a first radius R1 adjacent to the main cable body and a second radius R2 adjacent to the tonable lobe and a radius ratio is defined as the ratio between the second radius and the first radius (R2/R1). The radius ratio is greater than about 1 and more preferably greater than about 2.

Yet another aspect of the present invention is directed to a fiber optic drop cable having a main cable body having at least one optical waveguide disposed within a buffer tube, two strength components disposed on opposite sides of the buffer tube, a plurality of strength members, and a tonable lobe. The plurality of strength members being disposed at a plurality of respective interstices located between the buffer tube and the two strength components. The strength members each have a substantially triangular shape for improving the balancing of the residual stresses in the fiber optic cable due to shrinkage of a cable jacket during cooling. The tonable lobe is connected to the main cable body by a web that is frangible and the web has a first radius R1 adjacent to the main cable body and a second radius R2 adjacent to the tonable lobe. A radius ratio is defined as the ratio between the second radius and the first radius (R2/R1), wherein the radius ratio is greater than 1.

The present invention is also directed to a fiber optic drop cable having a main cable body with at least one optical waveguide and at least one strength component. A tonable lobe is connected to the main cable body by a web that is frangible. The web has a first thickness t1 adjacent to the main cable body and the tonable lobe has a minimum wall thickness t3, wherein a tear control ratio is defined as the ratio between the minimum wall thickness and the first thickness (t3/t1). The tear control ratio being greater than about 0.7.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operations of the invention.

DETAILED DESCRIPTION OF THE INVENTION

Figure 1:
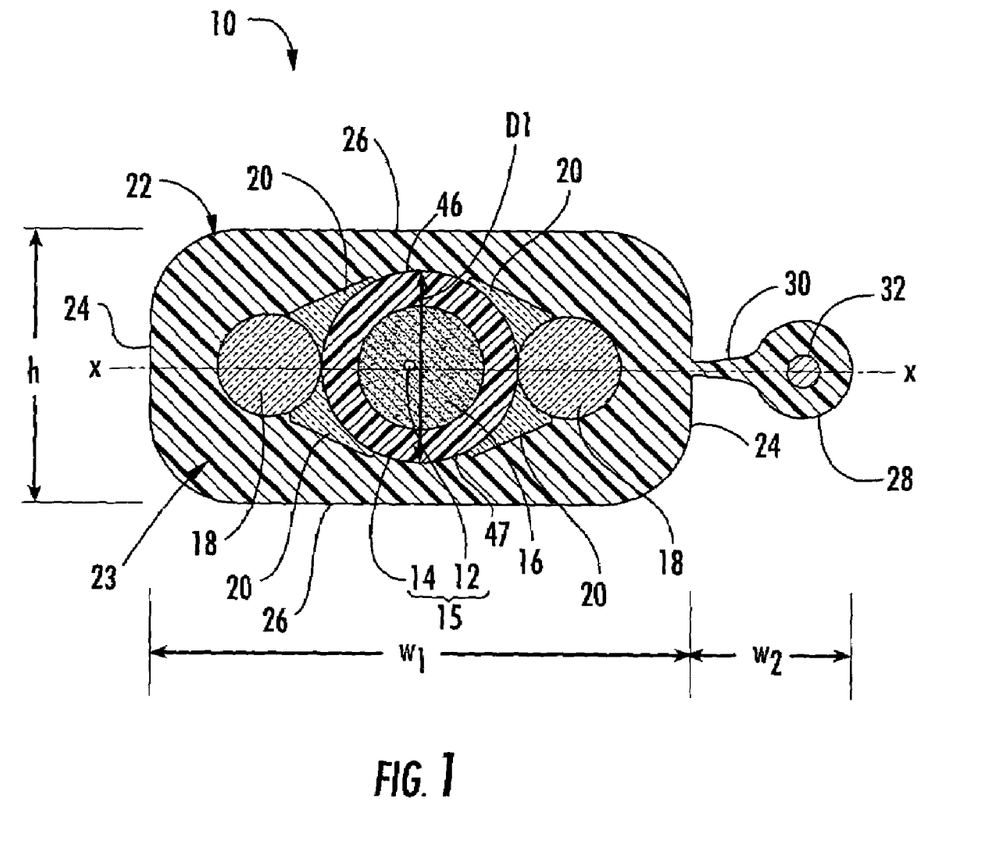
FIG. 1 is a cross-sectional view of one example of a fiber optic cable incorporating multiple aspects of the present invention.

Reference will now be made in detail to the present preferred embodiments of the invention, examples of which are illustrated in the accompanying drawings. Whenever possible, the same reference numerals will be used throughout the drawings to refer to the same or like parts. With reference to FIG. 1, one example of a fiber optic cable 10 according to the present invention will be described. Fiber optic cable 10 includes an optical transmission component 15, at least one strength component 18, at least one strength member 20, and a cable jacket 22 having a main cable body 23 and a toning lobe 28 that are connected by a web 30. Web 30 is frangible for separating toning lobe 28 from main cable body 23 in a clean and reliable manner as discussed below, thereby making cable 10 suitable for automated preconnectorization processes. In this cable, optical transmission component 15 includes a single optical waveguide such as an optical fiber 12 and a buffer tube 14, but other configurations of the optical transmission component are possible. For instance, optical transmission component 15 may include multiple optical fibers or the buffer tube may be eliminated such as in a tubeless configuration. Optical fiber 12 can be any type of optical fiber including, for example, a single-mode, multi-mode or dispersion shifted optical fiber. Likewise, optical transmission component 15 may include tight-buffered fibers, fiber bundles, fiber ribbons or other optical fiber configurations/groupings. In this cable, buffer tube 14 is sized to contain up to twelve optical fibers 12, but only a single optical fiber is depicted. Specifically, buffer tube 14 has a nominal outer diameter D1 of about 3.0 millimeters and an inner diameter of about 1.8 millimeters, but other suitable diameters such as smaller diameters are possible for other suitable fiber counts. The inner diameter is sized to accommodate a suitable excess fiber length (EFL) for the desired tensile and contraction windows for the intended fiber count. Additionally, buffer tube 14 may also house at least one waterblocking and/or water-swellable substance 16, for example, a gel, thixotropic grease, and/or a water-swellable tape, thread, or yarn for inhibiting the migration of water within buffer tube 14. Buffer tube 14 may be formed from a suitable polymer such as polypropylene, polyethylene, PVC and/or blends thereof.

As shown, cable 10 has two strength components 18 and four strength members 20, thereby providing a flexible cable design having the desired tensile rating with a relatively small cross-sectional footprint. The combination of strength components 18 and strength members 20 allows cables of the present invention to withstand the predetermined tensile loads and yet have a suitable overall bending flexibility, while still maintaining a relatively small cross-sectional footprint. Stated another way, cable 10 has an improved flexibility compared with another cable having the same tensile rating without the strength members since the GRPs would have to be larger making the cable stiffer and which may also increase the cross-sectional footprint. Consequently, cable 10 provides the craft with a cable having the desired tensile strength without surpassing a desired maximum level of cable stiffness, thereby allowing a cable to be bent or coiled to a predetermined radius of curvature as required for installation, slack storage, and the like.

Specifically, strength components 18 are relatively stiff rods such as glass reinforced plastic (GRPs) that provide the main source of anti-buckling strength and tensile strength, whereas strength members 20 are tensile yarns that generally lack anti-buckling strength but provide a significant amount of tensile strength. Strength components 18 may optionally include a water-swellable coating or the like disposed thereon for inhibiting the migration of water along the cable. Strength members 20 are tensile yarns that provide tensile strength, but generally lack anti-buckling strength and generally speaking do not resist bending. Strength members 20 may be formed from a group of fiberglass strands, aramid fibers or other suitable tensile yarns, and may also include a superabsorbent material thereon for inhibiting the migration of water along the cable. By way of example, strength components 18 are GRP components having a rod-like shape with a diameter of about 1.6 millimeters and strength members 20 are 800 tex fiberglass yarns, but other suitable materials may be used for either the strength components and/or strength members. In this example, each of the four individual strength members 20 has about 20% of the tensile strength rating of one of the strength components. In other words, the total tensile strength rating of all four strength members 20 is about 80% of one of the strength components 18.

During the manufacture of cable 10 the coupling of cable jacket 22 around the other cable elements can occur unevenly, thereby resulting in uneven or unbalanced residual stresses in cable jacket 22 due to shrinkage of a cable jacket during cooling. Generally speaking, coupling refers to load transfer mechanism that enables certain cable components to act as a composite structure, which is generally caused by the radial shrinkage of the jacket during cooling. In other words, shrinkage of the cable jacket in the radial direction enables coupling of certain cable components. It has been discovered that uneven coupling occurs when the strength components and/or the strength members are not uniformly located about optical transmission component 15 along the length of cable 10. Uneven coupling can cause bending or deflection of the end of the cable when cut. For instance, cable 10 will have uneven coupling of cable jacket 22 when the surface area of the optical transmission component contacting cable jacket 22 is non-uniform on opposing sides and/or changes along the length of the cable.

Figure 1A:
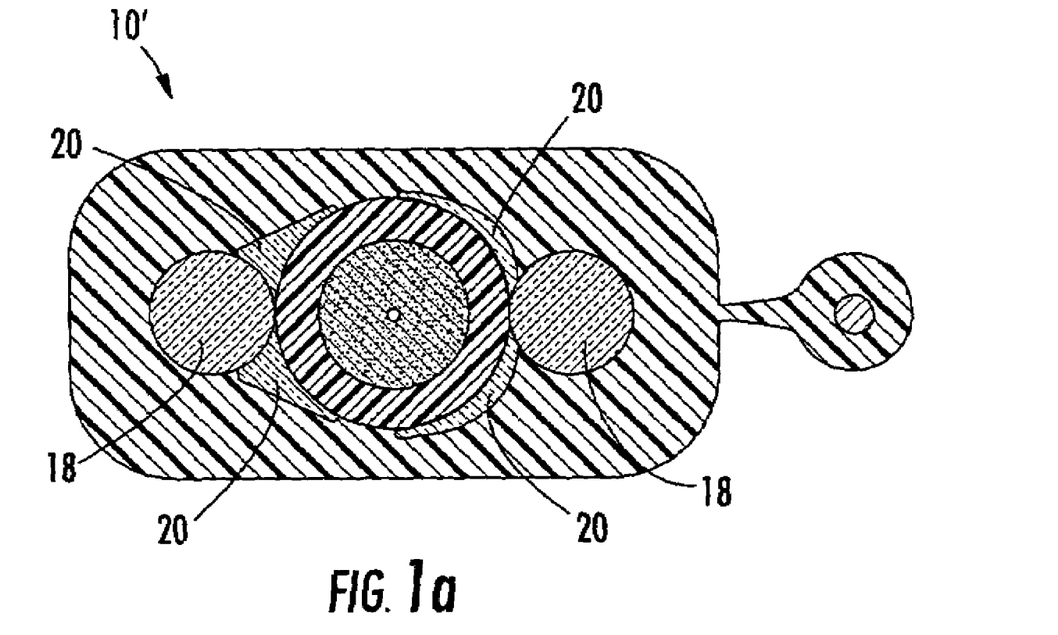
FIGS. 1a and 1b depict cross-sectional views of fiber optic cable having uneven coupling of the cable jacket that can cause problems in an automated preconnectorization process.
Figure 1B:
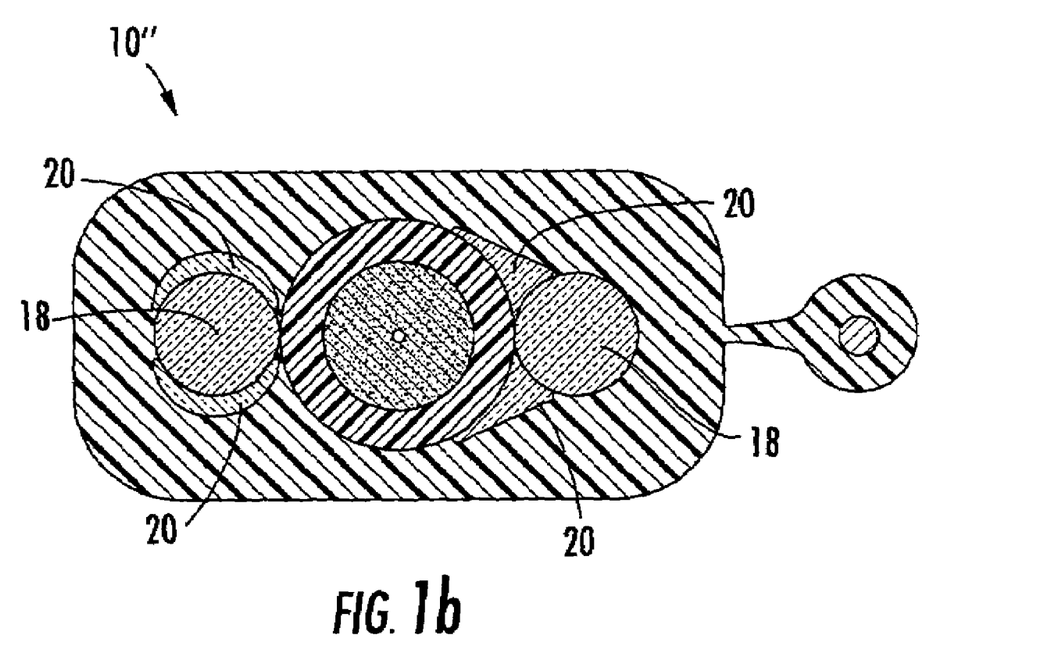

Illustratively, FIGS. 1a and 1b depict explanatory cross-sectional views of fiber optic cables similar to cable 10 having unbalanced cable jacket coupling. FIG. 1a depicts a cable 10' where the strength members 20 on the right-side of the optical transmission component have migrated to cover a larger area thereof compared with the left-side of the optical transmission component. Consequently, the coupling of the cable jacket with the optical transmission component on the right-side is reduced compared with the left-side since it has been covered by the strength members that have spread out to cover a larger area of the optical transmission component. FIG. 1b depicts a cable 10" where the top strength member 20 on the left-side of the cable has migrated about strength component 18 on the left-side. Again, this reduces the coupling of the cable jacket on the left-side of the cable compared with the right-side of the cable. Consequently, when cables 10' or 10" are cut they will deflect or bend to relieve the unbalanced residual stresses due to the unbalanced coupling.

Generally speaking, the cables shown in FIGS. 1a and 1b perform adequately with respect to the intended use even with the unbalanced residual stresses caused by uneven coupling of the cable jacket; however, such unbalanced residual stresses can be troublesome for the automation of cable preconnectorization. Specifically, when the cable is cut to length for connectorization or the like, it may deflect or bend in an unpredictable manner due to localized release of the residual stresses due to unbalanced coupling. In other words, any unbalanced residual stresses residing in the cable jacket are allowed to act longitudinally adjacent to the cut end of the cable, thereby causing the cable to deflect or bend unpredictably. Such unpredictable deflections or bending of the cable may pose problems during an automated connectorization process since the location of the cable end/cable components will vary. Thus, one embodiment of the present invention, generally balances the strength members and strength components about the optical transmission component so that the cable may be cut without causing undue deflection or bending of the cable end, thereby aiding automation of cable preconnectorization. Suitable shapes and orientations of the above tensile components, in particular after extrusion, will be discussed below. Of course, the concepts of the present invention can be practiced with cables designs that do not include the toning lobe such as a cable similar to cable 10 but without web 30 and attached toning lobe 28. Likewise, cables employing the concepts of the present invention can have other shapes beside the generally flat configuration of cable 10, i.e., having end sections 24 that are generally arcuate and a pair of generally flat-side sections 26.

Figure 2:
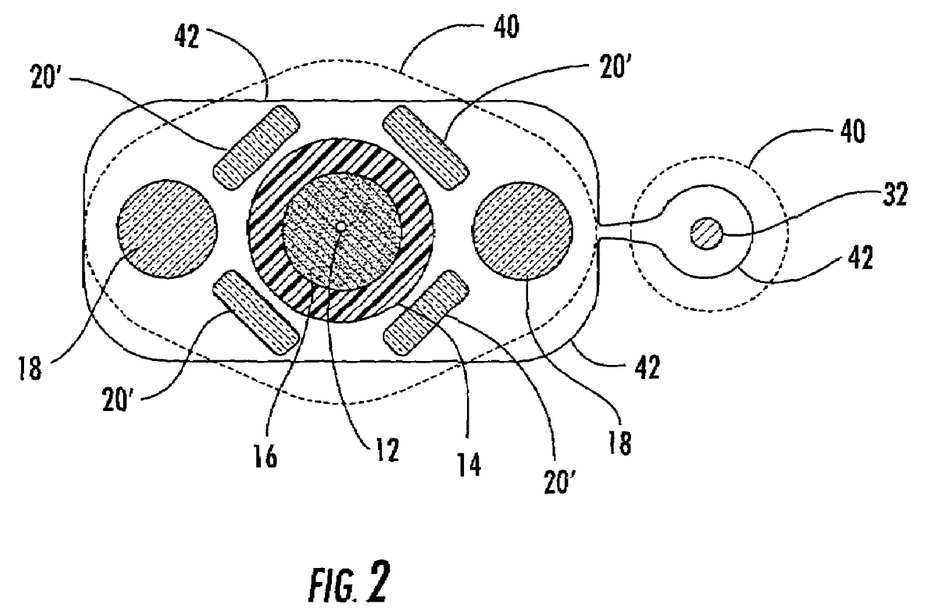
FIG. 2 is a schematic cross-sectional representation showing tip entry and die exit outlines of one example of a die head design useful for extruding cables as in FIG. 1.

As shown in FIG. 1, strength members 20 are formed in four locations within cable 10. Specifically, strength members 20 are disposed within interstitial spaces between buffer tube 14 and strength components 18 in a compact manner. Before cable manufacture is completed, the strength members have a generally rectangular cross-sectional shape. For example, strength members 20' may have cross-sectional dimensions of about 0.25 millimeters by about 2.5 millimeters when passing into the extrusion tooling as generally shown by FIG. 2. During manufacture, strength members 20 are shaped in the die head to the desired shape as shown in cable 10 of FIG. 1. As shown, the four strength members 20 are disposed in the interstices with a substantially triangular shape after manufacture, thereby allowing relatively even coupling of the cable jacket with the other cable components. Consequently, when an end of cable 10 is cut for connectorization, the bending or deflection of the end is reduced compared with the cables shown in FIGS. 1a and 1b because the unbalanced residual stress is reduced.

Figure 3:
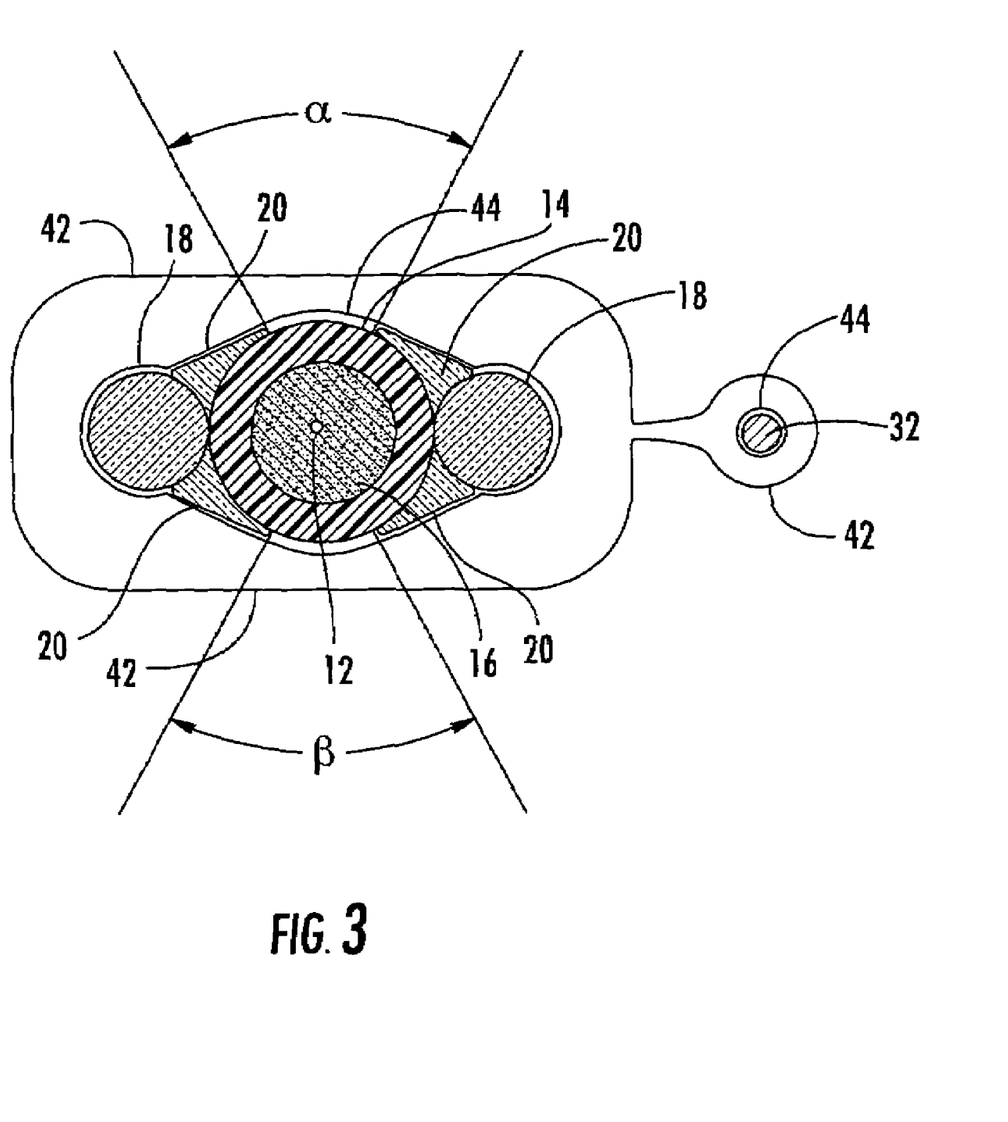
FIG. 3 is a schematic cross-sectional representation of the die head design of FIG. 2 showing tip exit and die exit outlines.

Cable 10 may be manufactured by operation of pressure extrusion tooling, using an exemplary die and tip design as schematically illustrated in FIGS. 2 and 3. However other methods and structures may also be used to manufacture the cable of FIG. 1 and variations thereof described herein. As schematically depicted in FIGS. 2 and 3, the extrusion tooling extrudes jacketing material about the strength components 18, strength members 20, optical transmission component 15, and a toning wire 32 as the components are fed into the tooling. As the cable components are fed into the extrusion tooling, a jacketing compound, e.g., polyethylene or other suitable compound, is supplied under suitable temperature and pressure conditions to the tooling. The jacketing compound generally surrounds the cable components thereby forming cable jacket 22 therearound. Of course, cable jacket 22 may be formed from other suitable thermoplastics, such as a medium density polyethylene (MDPE), polypropylene, PVC, or the like. By way of example, cable jacket 22 has a width w1 of about 8-9 millimeters, a width w2 of toning lobe 28 and web 30 of about 2-3 millimeters, and a height of about 4-5 millimeters. Of course, other suitable dimensions are possible for the cable jacket.

Specifically, FIG. 2 shows a cross-section of a tip entrance profile 40 superimposed on an outline of the die exit 42. FIG. 3 shows a cross-section of a tip exit profile 44 superimposed on the die exit profile. For purposes of this disclosure, die exit profile 42 is considered coextensive with the outer surface of cable 10, although some shrinkage in jacket material is to be expected during cooling. One skilled in the art is able to fine tune the tip and die profiles as needed to achieve the various designs disclosed herein without undue experimentation, taking into account typical jacketing material shrinkages, tolerances, etc.

During travel through the tooling and in particular the die tip, the various cable components are placed so as to achieve the orientation of cable components shown in FIG. 1. In particular, strength members 20 are compressed from the generally rectangular shape into substantially triangular shapes, within interstices between buffer tube 14 and strength components 18. Of course, the substantially triangular shape of the strength member can have some variation in shape while still providing generally balanced coupling such as conforming to the round shape of buffer tube 14 and respective strength components 18 on respective sides. In FIG. 2, four such strength members 20' are shown within tip entrance profile 40 prior to compression within the tip to achieve the shape and orientation within tip exit profile 42. It should be understood that variations in the number and shape of strength member yarns 20', as well as changes to tip profiles 40 and 42, are possible within the scope of the present invention.

One or more of the following attributes may be achieved during extrusion. For example, strength components 18 are located generally adjacent to the optical transmission component and preferably contact the same, thereby allowing for a cable having a compact cross-sectional footprint. Further, strength members 20 are placed in interstitial areas between buffer tube 14 and strength components 18. Strength members 20 are generally in contact with buffer tube 14 and an adjacent strength component 18 so as to form a substantially triangular shape that conforms to the sides of buffer tube 14 and strength component 18. Additionally, the respective centers of strength components 18 and buffer tube 14 are preferably generally aligned along an X-X axis, thereby creating a preferential bend characteristic for the cable.

As shown in FIG. 1, the shape of strength members 20 is substantially triangular as it is placed into the interstice, however, such shape is not required for all aspects of the invention since other cable configurations are possible such as using strength components having shapes other than round. Also, it is noted that strength members 20 are generally speaking symmetrically disposed about the buffer tube or optical component and do not extend all the way around optical transmission component 15, thereby influencing the coupling of cable jacket 22 therewith. Specifically, a top portion 46 and a bottom portion 47 (hereinafter portions 46,47) of buffer tube 14 contact cable jacket 22 directly. As depicted, portions 46, 47 extends through about the same respective angles along the buffer tube or the optical component. In cable 10, the respective angles are about 45 degrees about the circumference of buffer tube 14, although in other configurations the angles may vary. Preferably, portions 46 and 47 are substantially equal in size and symmetrical in location about the buffer tube or optical component for purposes of uniform coupling of cable jacket 22. As shown in FIG. 3, tip exit profile 44 is generally constructed to form strength members 20 into the desired shape, i.e., substantially triangular, while maintaining a pair angles α and β are about equal so that portions 46,47 in cable 10 end up about equal. In other words, the tooling inhibits the strength members from migrating out of their desired positions and/or shapes.

In preferred embodiments, strength members 20 do not extend beyond (up and down as shown in FIG. 1) buffer tube 14 toward side sections 26 of cable 10, but may extend therebeyond by design and/or in manufacturing variation. Consequently, the preferred embodiments have minimum jacketing thickness requirements that are defined by the diameter D1 of buffer tube 14. Were strength members material to extend beyond buffer tube 14 so as to become the outermost element (vertically, as shown), then additional jacketing material may be required, at least adjacent strength members 20, to form a minimum jacket thickness. If a uniformly flat side section 26 were desired, then the additional thickness would generally extend along the entire side sections 26. The illustrated cable construction of FIG. 1 thus uses less jacketing material and/or allows for a smaller cable cross-sectional footprint (i.e., the cable height is reduced). Also, allowing jacketing material to contact buffer tube 14 at points 46 and 47 allows for coupling that is beneficially improved for automation of preconnectorization and/or uniformly distributed along the cable, thereby inhibiting the unpredictable bending or deflection of the cable when cut.

It may also be noted that strength members 20 are in contact with less than 180 degrees of the circumference about strength components 18. In other words, strength components 18 are in contact with the jacketing material for more than 180 degrees of the circumference of the strength components. As above, increasing the amount of strength component 18 in contact with jacket 22 aides in improving the evenness of coupling of the jacketing material, thereby leading to more uniform residual stresses within the cable and inhibiting the deflection or bending of the resulting cable when cut. Also, symmetry along horizontal and vertical axis (as shown in FIG. 1) of the location of strength members 20 in interstitial spaces between strength components 18 and buffer tube 14, as well as symmetry of locations of buffer tube 14 and strength components 18 relative to each other, also helps provide for more even coupling within the cable.

It should be understood however, that each and every characteristic above is not required to practice the concepts of the present invention, whether related to strength element design, shapes, and/or location as described above, or whether related to toning lobe and web design as described below.

The orientation of cable components 15, 18, and 20 within jacket 22 is achieved by virtue of the tip entrance and exits shown in FIGS. 2 and 3. Thus, the various elements are fed into the tip and the reduced size of the opening within the tip squeezes the elements together in a desired configuration. While it is impossible as a practical matter to perfectly align such cable components entirely uniformly along an entire cable, one of skill in the art can design tooling achieve the resulting orientation as shown in FIG. 1, in view of the disclosures related to FIGS. 1-3.

As stated above, it would be possible to modify the structure above in various ways to modify their attributes of the resulting cable product. For example, two strength members 20' could be used instead of four, with a portion of the strength members being disposed between strength components 18 and buffer tube 14. Also, instead of the optical transmission component shown, different optical transmission components or structures may be used. Also, depending upon the desired tensile and bending characteristics, the relative diameters of the strength components and the size and amount of strength member material used could be varied to achieve desired ratings. Additionally, in certain situations, nonsymmetrical designs could be used, for example using only one strength component 18 or differing numbers and or placements of other cable components.

Figure 4:
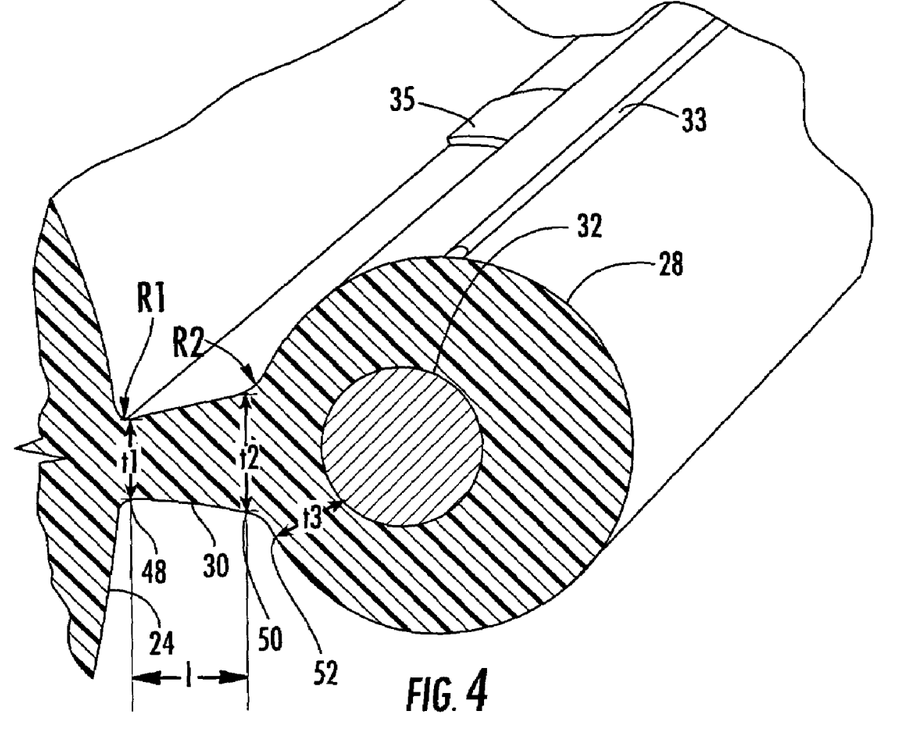
FIG. 4 is an enlarged view of a portion of a cable similar to the cable of FIG. 1 showing the toning lobe and web portions in greater detail and identifying certain parameters thereon.
Figure 5:
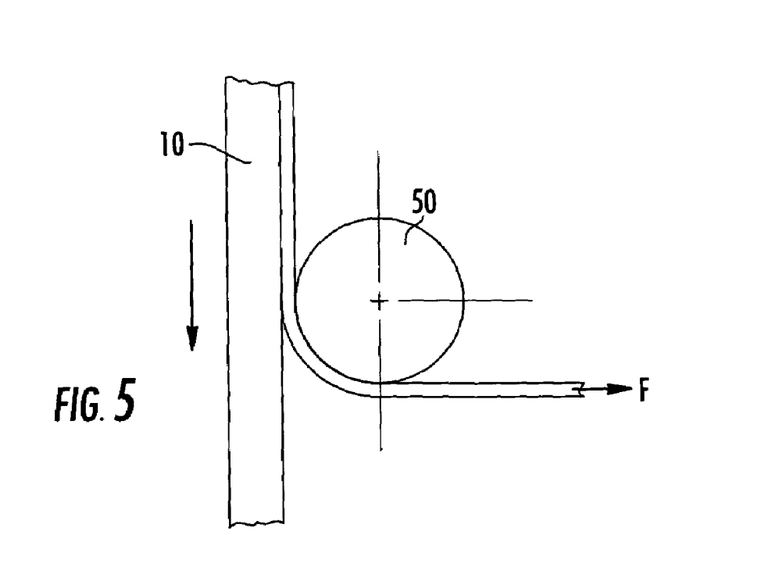
FIG. 5 is a schematic representation of a testing jig used for measuring a separation force of a tonable lobe from the fiber optic cable of FIG. 1.

Turning now to FIG. 4, an enlarged view of toning lobe 28 and web 30 of a cable similar to cable 10. Specifically, the enlarged view of FIG. 4 is similar to cable 10 except it depicts a concentricity error of the toning wire with the tonable lobe as may occur during manufacturing. FIG. 4 also illustrates certain dimensions related to these portions that can influence tear performance so that toning lobe 28 and web 30 are reliably and cleanly separated from an end portion 24 of cable 10 with the application of a predetermined separation force. Moreover, the preferred separation force for the toning lobe prevents an excessive separation force while inhibiting inadvertent separation during cable bending, coiling, and the like. Preferably, the separation force is between about 10 Newtons and about 50 Newtons for the desired performance and more preferably between about 15 Newtons and about 30 Newtons. The separation force is measured as the toning lobe is pulled away from the main cable body along the X-X axis as shown in FIG. 1; however, the toning lobe may be separated by pulling in other directions. As shown in FIG. 5, a preferred way of measuring the separation force uses a testing jig (not numbered) that routes the toning lobe portion being pulled about a sheave 50 that rotates. Additionally, the testing jig allows the cable to move in a direction generally perpendicular to an applied force F as it is applied during separation. Thus, the force measured is the separation force applied along the X-X axis.

As shown in FIG. 4, cable 10 has a first radius R1 that is defined between end portion 24 and base portion 48 of web 30. A second radius R2 is defined between distal portion 50 of web 30 and lobe 28. According to one aspect of the present invention selecting a predetermined relationship between R1 and R2, i.e., a radius ratio of R2/R1, improves the separation of web 30 and toning lobe 28 from end portion 24. FIG. 4 also shows a first thickness t1, a second thickness t2, and a third thickness t3. First thickness t1 is the thickness at the base portion 48 of web 30, second thickness t2 is the thickness at the distal portion 50 of web 30, and third thickness t3 is a thickness of lobe 28 near R2. Third thickness t3 is measured at a point of a minimal wall thickness 52 facing end section 24, measured radially outwardly from the center of wire 32 generally in the direction of arcuate section 24 of main cable body 23. Third thickness t3 is a point at which stresses will increase during the separation of toning lobe 28 and web 30 from main cable body 23. If toning wire 32 is perfectly concentrically located within toning lobe 28, then t3 is the difference in radii between toning lobe 28 and the toning wire 32. However, toning wire 32 is not always concentrically disposed within toning lobe 28 in a manufactured cable. By way of example, FIG. 4 shows toning wire 32 having a concentricity error with respect to toning lobe 28 so that thickness t3 is not the difference in radii between toning lobe 28 and toning wire 32. Generally speaking, the concentricity error can occur during the normal manufacture of cable 10 and can affect the separation/tear performance.

Aspects of the present invention involve selecting a predetermined relationship of certain combinations of thicknesses t1, t2 and t3 (either along with or separate from the R1 and R2 relationship) for improving the separation of web 30 and toning lobe 28 from end portion 24 from main cable body 23. By way of example, the desired reliable and clean separation of toning lobe 28 and web 30 along base portion 48 is more likely to occur when t2 is greater than t1, i.e., a thickness ratio t2/t1 is greater than unity. Also, it has been determined that desired separation of toning lobe 28 and web 30 at base portion 48 is more likely to occur if a tear control ratio t3/t1 is greater than about 0.7, thereby inhibiting tearing along the minimal thickness portion 52 where t3 is measured. Likewise, if R2 is greater than R1, (i.e. the radius ratio of R2/R1 is greater than unity) web 30 is more likely to be torn at base portion 48 rather than another location on the web towards the distal portion 50 when the separation force is applied.

Stated numerically, preferably the tear control ratio t3/t1 is greater than 0.7; more preferably, the ratio is greater than about 0.74; and, most preferably the ratio is greater than about 0.81. Also, for the desired separation performance, the thickness ratio t2/t1 is greater than about 1.0, and more preferably greater than about 1.10, and most preferably greater than about 1.15. Moreover, for desired separation, the radius ratio R2/R1 is greater than about 1.0, more preferably about 2.0 or greater, and most preferably about 4.0 or greater. It should be understood that all of these relationships need not be satisfied simultaneously according to the scope of the present invention to achieve improved separation of the web and toning lobe from the main cable body.

The above stated parameters tend to induce stress concentrations in the desired location (across base 48), leading to desired separation performance. This desired separation performance is especially advantageous in automated preconnectorization applications, but is also advantageous for separation by hand. Simply stated, the above mentioned dimension ratios inhibit stretching and/or tearing of web material in undesired locations (and/or tearing out of the toning wire from the toning lobe) and instead concentrates the tearing stress at base 48, thereby achieving separation/tear characteristics resulting in a reliable and clean separation. Thus, an uneven distribution of stress across base portion 48 whereby, for example, high stresses are induced along a surface of base portion 48 and relatively lower stresses are induced across the central portion of base portion 48 may not produce the desired tear, in particular if higher and more evenly distributed stresses are induced at distal portion 50 or a minimum wall thickness 52. However, the separation performance may be a function of more than one parameter, for instance, the same value of the tear control ratio t3/t1 may perform differently based on varying other web dimensions and/or toning lobe dimensions.

Illustratively, table 1 below includes information regarding a number of exemplary simulated, iterative designs using suitable modeling software in which R1, R2, t1, and t2 parameters were set and the t3 parameter was iteratively varied, so as to investigate the affect the tear control ratio t3/t1. In the simulated design, toning lobe 28 had an outer diameter (not labeled) of 1.0 millimeter with a 24 AWG copper wire and the length 1 of web 30 was 0.5 millimeters. As depicted in Table 1, different values of the ratios of t2/t1 and R2/R1 can influence the values for "acceptable" and "unacceptable" separation performance. A rating of "acceptable" means the simulated model indicated tearing at web base portion 48 and a rating of "unacceptable" means the simulated model indicated tearing at minimum wall thickness 52. Additionally, further iteration could identify a more precise cross-over between the two values for each tear control ratio t3/t1, meaning the acceptable ratio for each set of parameters wherein tearing is at the desired base portion 48 is likely between the acceptable and unacceptable values shown in Table 1. Likewise, the other ratios may perform differently based on varying other web dimensions and/or toning lobe dimensions.

TABLE 1

| | | t3/t1 | |
|---|---|---|---|
| T2/t1 | R2/R1 | Acceptable | Unacceptable |
| 1.11 | 3.00 | 0.81 | 0.77 |
| 1.17 | 10.00 | 0.78 | 0.75 |
| 1.15 | 5.00 | 0.75 | 0.71 |
| 1.13 | 8.33 | 0.70 | 0.67 |
| 1.10 | 1.20 | 0.77 | 0.73 |
| 1.03 | 1.20 | 0.77 | 0.74 |
| 1.09 | 2.00 | 0.74 | 0.70 |
| 1.03 | 2.00 | 0.74 | 0.71 |

Of course, other suitable dimensions and/or combinations of dimensions may be used to arrive at a cable having a suitable separation performance. In one preferred embodiment, toning wire 32 is a 24 AWG copper wire having a diameter of about 0.5 millimeters, toning lobe 28 has an outer diameter (not labeled) of about 1.7 millimeters, and web 30 has a length 1 of about 0.9 millimeters. In this embodiment, the length 1 was about 0.9 millimeters (almost double of the simulated model) to allow a sufficient amount of cooling water to contact web 30 during manufacture, thereby aiding in generally uniform cooling and inhibiting deformation of the extruded shape. Tooling was designed and a cable was manufactured according to this preferred embodiment dimensions so that it had suitable separation/tear characteristics, thereby making it suitable for an automated preconnectorization process. Specifically, the dimensions of a cross-section of the manufactured cable were examined and measured. One skilled in the art understands that variations in manufacturing, shrinkage and the like can cause the same cable or other cables manufactured using the same tooling to have other values when measured at different cross-sections along the cable. Typical values for the cross-section of the manufactured cable were examined and measured as follows, R2 was about 0.25 millimeters and R1 was about 0.05 millimeters for a radius ratio of R2/R1 of about 5; t2 was about 0.6 millimeters and t1 was about 0.3 millimeters for a thickness ratio of t2/t1 or about 2.0; and t3 was about 0.3 millimeters for a tear control ratio t3/t1 of about 1.0. Cables of the present invention can have other suitable dimensions for the toning lobe, toning wires, and/or web, thereby resulting in different ratios.

As utilized herein, R1 and R2 refer to a radius of curvature at the illustrated locations. It is recognized, however, that the radius of curvature of complex shapes often varies, either according to a formula (for example along an ellipse) or otherwise in two or three dimensions. Therefore, the radius of curvature discussed herein is not limited to circular, arcuate two-dimensional shapes. Also, the radius of curvature illustrated applies generally to the identified region (i.e., along the base portion 48 of web 30), not just at the exact point illustrated. The same concepts apply to the thicknesses t1, t2, and t3 as to localized two- and three-dimensional variation. Therefore, it is within the scope of the invention to utilize the radius and thickness information discussed herein in various ways within and along the portions of the structures discussed. Moreover, FIG. 4 illustrates that the web 30 is generally symmetrical about the X-X axis (FIG. 1); however, the web may optionally be asymmetric about the X-X axis. By way of example, web 30 and toning lobe 28 can be designed to have preferential tear direction (i.e., the web 30 prefers to tear in one direction) by using different radii on the one side of the X-X axis. For instance, the values of R1 and R2 on the opposing side of the X-X axis can be larger to create a preferential tear direction for web 30. The preferential tear direction can be marked with an indicia 33 such as a stripe, protrusion in the extrusion or the like. Likewise, web 30 can optionally include a rip stop 35 of increased material disposed periodically along the length of web 30 for inhibiting the tear from propagating unless a sufficient force is provided. Rip stop 35 can be formed along the cable by pulsating the extrusion at the web or in other suitable ways as known to one skilled in the art.

Also, persons of ordinary skill in the art will appreciate that variations and modifications of the foregoing embodiments may be made without departing from the scope of the appended claims. For example, optical transmission component may comprise at least one tight buffered fiber and/or a bundle of optical fibers. As an alternative to glass reinforced plastic, strength components can be metallic or aramid fibers impregnated with a suitable plastic material so as to provide added stiffness. Although a circular cross section for strength components and a substantially triangular cross section for strength members 20 are disclosed, other cross sectional shapes may be used as well. The concepts described herein can be applied to many cable designs, for example, self-supporting, buried, indoor, and indoor/outdoor cable applications. Flame retardant jacket materials can be selected to achieve plenum, riser, or LSZH flame ratings. Also additional water blocking protection can be added. For example, at least one water-swellable tape or yarn (not shown) can be disposed adjacent to the optical transmission component. Cables according to the present invention may also include at least one electrical conductor for power or data transmission, for example, at least one coaxial or single wire, or a twisted pair of wires. Ripcords and/or an armor layer can be added adjacent buffer tube 14.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A fiber optic drop cable comprising:
   a main cable body, the main cable body having at least one optical waveguide disposed in a buffer tube;
   two strength components disposed on opposite sides of the buffer tube; and
   a plurality of strength members disposed at a plurality interstices located between the buffer tube and the two strength components, wherein the plurality of strength members are flexible tensile yarns shaped into a plurality of substantially triangular shapes for improving the balancing of the residual stresses in the fiber optic cable due to shrinkage of a cable jacket dining cooling.

2. The fiber optic drop cable of claim 1, further comprising a tonable lobe, the tonable lobe being connected to die main cable body by a web that is frangible, wherein the tenable lobe has a toning wire that includes a copper material for locating the fiber optic drop cable.

3. The fiber optic drop cable of claim 2, the web having a first thickness t1 adjacent to the main cable body and the tonable lobe having a minimum wall thickness t3, wherein a tear control ratio is defined as the ratio between the minimum wall thickness and the first thickness (t3/t1), wherein the tear control ratio is greater than about 0.7.

4. The fiber optic drop cable of claim 2 wherein the web has a first radius R1 adjacent to the main cable body and a second radius R2 adjacent to the tonable lobe and a radius ratio is defined as the ratio between the second radius and the first radius (R2/R1) wherein the radius ratio is greater than 1, and the radius ratio is greater than about 2.0.

5. The fiber optic drop cable of claim 1, the buffer tube having a thixotropic grease therein.

6. The fiber optic drop cable of claim 1, further comprising a web that is frangible and connects a tonable lobe to the main cable body, the web having a first thickness t1 adjacent to the main cable body and a second thickness t2 adjacent to the tonable lobe and a thickness ratio is defined as the ratio between the second thickness and the first thickness (t2/t1), wherein the thickness ratio is greater than 1, wherein the tonable lobe has a toning wire that includes a copper material for locating the fiber optic drop cable.

7. The fiber optic drop cable of claim 1, the main cable body having a width of about 10 millimeters or less and a height of about 5 millimeters or less.

8. The fiber optic drop cable of claim 1, further comprising a web that is frangible and connects a tonable lobe to the main cable body, the toning lobe having a separation force from the main cable body between about 10 Newtons and about 50 Newtons along a X-X axis, wherein the tonable lobe has a toning wire that includes a copper material for locating the fiber optic drop cable.

9. A fiber ontic drop cable comprising:

a main cable ho the main cable body having at least one optical waveguide, at least one strength component, and a cable jacket; and a tonable lobe, the tonable lobe having a toning wire that includes a copper material for locating the fiber optic drop cable, the tonable lobe being connected to the cable jacket of the main cable body by a web that is frangible, wherein the web has a first radius R1 adjacent to the main cable body and a second radius R2 adjacent to the tonable lobe, and a radius ratio is defined as the ratio between the second radius and the first radius (R2/R1), wherein the radius ratio is greater than about 1.

the at least one optical waveguide being housed in a buffer tube, the main cable body having two strength components and a plurality of strength members disposed at a plurality interstices between the buffer tube and the two strength components, and the plurality of strength members being shaped into a plurality of substantially triangular shapes for improving the balancing of the residual stresses in the fiber optic cable due to shrinkage of a cable jacket during cooling.

10. A fiber optic drop cable comprising:

a main cable body, the main cable body having at least one optical waveguide disposed within a buffer tube and two strength components disposed on opposite sides of the buffer tube and a plurality of strength members, the plurality of strength members being disposed at a plurality interstices located between the buffer tube and the two strength components, wherein the strength members are flexible tensile yarns having a substantially triangular shape for improving the balancing of the residual stresses in the fiber optic cable due to shrinkage of a cable jacket during cooling; and a tonable lobe, the tonable lobe having a toning wire that includes a copper material for locating the fiber optic drop cable and the tonable lobe being connected to the main cable body by a web that is frangible, wherein the web has a first radius R1 adjacent to the main cable body and a second radius R2 adjacent to the tonable lobe and a radius ratio is defined as the ratio between the second radius and the first radius (R2/R1), wherein the radius ratio is greater than 1.

11. The fiber optic drop cable of claim 10, the web having a first thickness t1 adjacent to the main cable body and the tonable lobe having a minimum wall thickness t3, wherein a tear control ratio is defined as the ratio between the minimum wall thickness and the first thickness (GAl), wherein the tear control ratio is greater than. about 0.7.

12. The fiber optic drop cable of claim 1, the buffer tube having a thixotropic grease therein.

13. The fiber optic drop cable of claim 10, the web having a first thickness t1 adjacent to the main cable body and a second thickness t2 adjacent to the tonable lobe and a thickness ratio is defined as the ratio between the second thickness and the first thickness (t2/t1), wherein the thickness ratio is greater than 1.

14. The fiber optic drop cable of claim 10, the main cable body having a width of about 10 millimeters or less and a height of about 5 millimeters or less.

15. The fiber optic drop cable of claim 10, the tonable lobe having a separation force from the main cable body between about 10 Newtons and about 50 Newtons along a X-X axis.

16. A fiber omic drop cable comprising;

a main cable body the main cable body having at least one optical waveguide and at least one strength component; and a tonable lobe, the tonable lobe having a toning wire that includes a copper material for locating the fiber optic drop cable and the tonable lobe being connected to the main cable body by a web that is fiangible, wherein the web has a first thickness t1 adjacent to the main cable body and the tonable lobe has a minimum wall thickness t3, wherein a tear control ratio is defined as the ratio between the minimum wall thickness and the first thickness (t3/t1), wherein the tear control ratio is greater than about 0.7.

the main cable body having two strength components and a plurality strength members disposed at a plurality interstices between a buffer tube and the two strength components, and the strength members being shaped into a plurality of substantially triangular shapes for improving the balancing the residual stresses in the fiber optic cable due to shrinkage of a cable jacket during cooling.

* * * * *